(12) United States Patent
Herena et al.

(10) Patent No.: US 12,509,998 B1
(45) Date of Patent: Dec. 30, 2025

(54) CRANK GEAR

(71) Applicant: Hamilton Sundstrand Corporation, Charlotte, NC (US)

(72) Inventors: Leela Herena, Streamwood, IL (US); Matthew Slayter, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/811,104

(22) Filed: Aug. 21, 2024

(51) Int. Cl.
*F01D 21/00* (2006.01)

(52) U.S. Cl.
CPC .... *F01D 21/003* (2013.01); *F05D 2260/4031* (2013.01); *F05D 2260/83* (2013.01)

(58) Field of Classification Search
CPC .............................. F05D 2260/40; F01D 25/34
See application file for complete search history.

(56) References Cited

U.S. PATENT DOCUMENTS

| | | | |
|---|---|---|---|
| 4,580,534 | A | 4/1986 | Blum et al. |
| 8,813,607 | B2 | 8/2014 | Blewett et al. |
| 8,845,275 | B2 | 9/2014 | Short et al. |
| 9,726,132 | B2 | 8/2017 | Pawlicki |
| 11,260,516 | B1 | 3/2022 | Roberts |
| 11,608,757 | B2 | 3/2023 | Capoccia |

FOREIGN PATENT DOCUMENTS

WO    WO-2023209291 A1 * 11/2023 ............. F02C 7/268

OTHER PUBLICATIONS

Translation of WO_2023209291_A1 (Year: 2023).*

* cited by examiner

*Primary Examiner* — Jacob J Cigna
(74) *Attorney, Agent, or Firm* — Kinney & Lange, P.A.

(57) ABSTRACT

A crank gear includes a shaft extending along a centerline. A first bearing, a second bearing, and a gear are mounted to the shaft. An interface at the first end of the shaft for rotating the shaft and the gear about the centerline. The crank gear is reversibly insertable through a port of a gearbox to engage a gear. The gear is rotationally coupled to a rotor of a gas turbine engine.

13 Claims, 8 Drawing Sheets

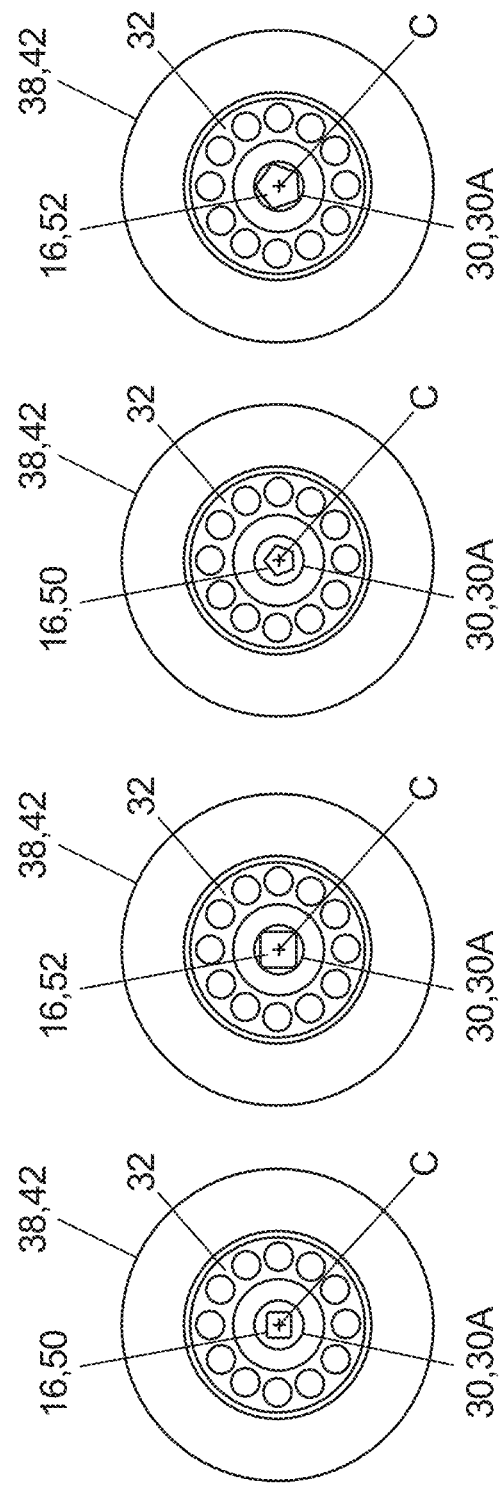

CRANK GEAR

BACKGROUND

This invention relates generally to maintaining gas turbine engines, and specifically to manually rotating a rotor of the gas turbine engine.

Maintenance and inspection of gas turbine engines often requires manual rotation of a rotor to gain access to blades and other features of the rotor. For this purpose, a gearbox rotationally coupled to the rotor may include a tool interface permanently built into one of the gears or shafts of the gearbox. While such features are considered satisfactory for the intended purpose, permanent features of the gearbox used to facilitate manual rotation can add weight to the gearbox and are susceptible to wear, which can increase the cost of manufacture, maintenance, and the cost of repair.

SUMMARY

A crank gear according to an example embodiment includes a shaft extending along a centerline from a first end to a second end opposite the first end. A first bearing, a second bearing, and a gear are mounted to the shaft. An interface at the first end of the shaft for rotating the shaft and the gear about the centerline. In some embodiments, the interface can include a bar extending radially outward relative to the centerline and a handle at a distal end of the bar. In other embodiments, the interface can include a tool socket at the first end of the shaft. In yet other embodiments, the interface can include a tool driver formed at the first end of the shaft.

In another further example, the first bearing has an outer diameter that is larger than the outer diameter of the second bearing. The gear is disposed between the first bearing and the second bearing. The first bearing is spaced from the first end of the shaft to coincide with a port of the gearbox housing, and the second bearing is disposed at the second end of the shaft to coincide with a journal of the gearbox housing in an inserted configuration.

In another further example, the second bearing is disposed between the first bearing and the first end of the shaft. The gear is disposed at the second end of the shaft to define a cantilevered configuration.

A method for manually rotating a rotor of a gas turbine engine according to an example embodiment of this disclosure includes inserting, by an operator, a crank gear through a port of a gearbox until mutual engagement of the gear of the crank gear and at least one gear of the gearbox. The method further includes rotating the rotor of the gas turbine engine by the operator applying a torque to the interface of the crank gear. A further embodiment of the method can include inserting the crank gear along a parallel direction or a non-parallel direction relative to the rotational axis of the at least one gear of the gearbox. A further embodiment of the method can include removing the crank gear completely from the gearbox.

BRIEF DESCRIPTION OF THE DRAWINGS

FIG. 3A and FIG. 3C are end views of crank gear in which the interface includes a tool socket.

FIG. 3B and FIG. 3D are end views of crank gear in which the interface includes a tool drive.

DETAILED DESCRIPTION

Figure 1:
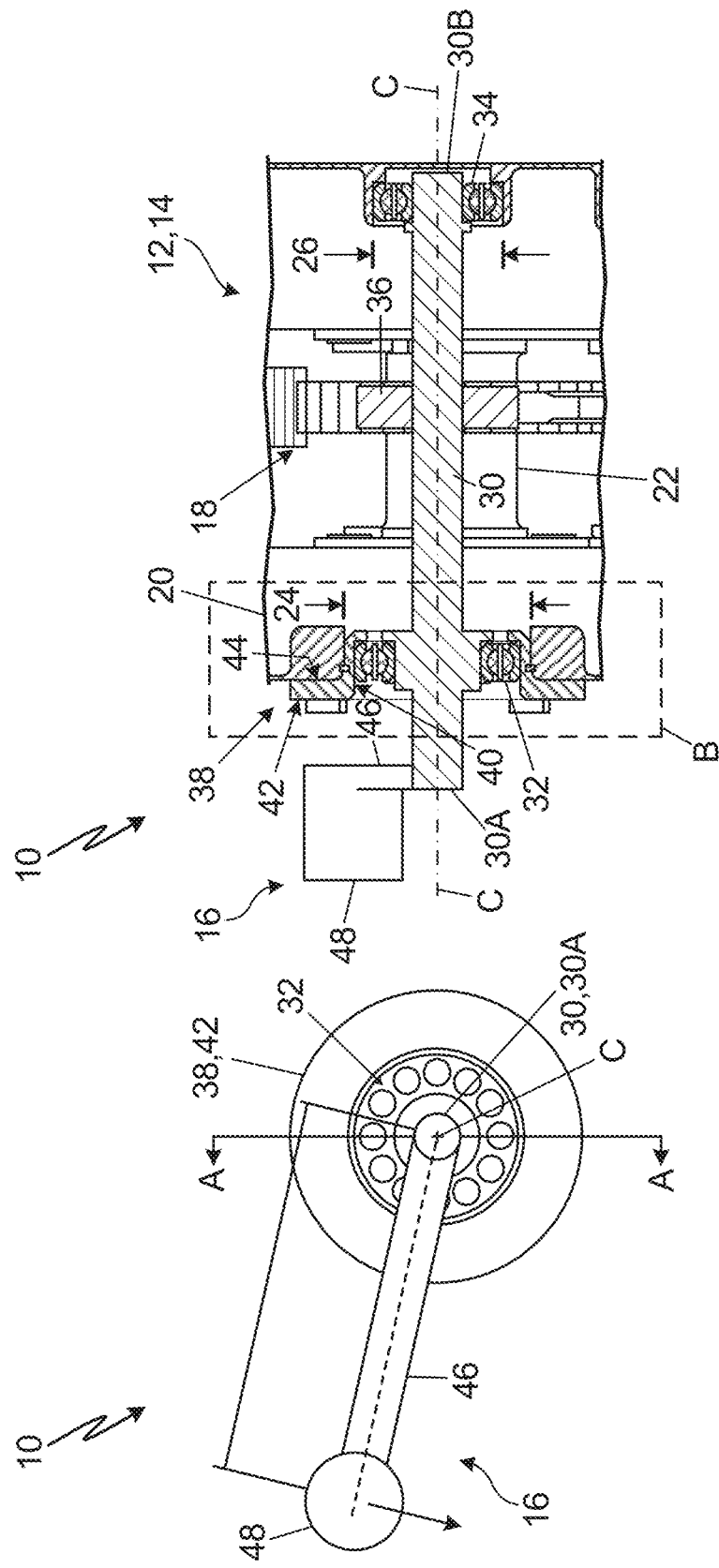
FIG. 1A and FIG. 1B are views of a crank gear with a hand-operated interface.

FIG. 1A and FIG. 1B are views of an example crank gear 10 engaging gearbox 12 of gas turbine engine 14. FIG. 1A is an end view of crank gear 10 depicting interface 16. FIG. 1B is a cross-sectional view taken along line A-A of FIG. 1A depicting crank gear 10 inserted within gearbox 12 of gas turbine engine 14.

Figure 2:
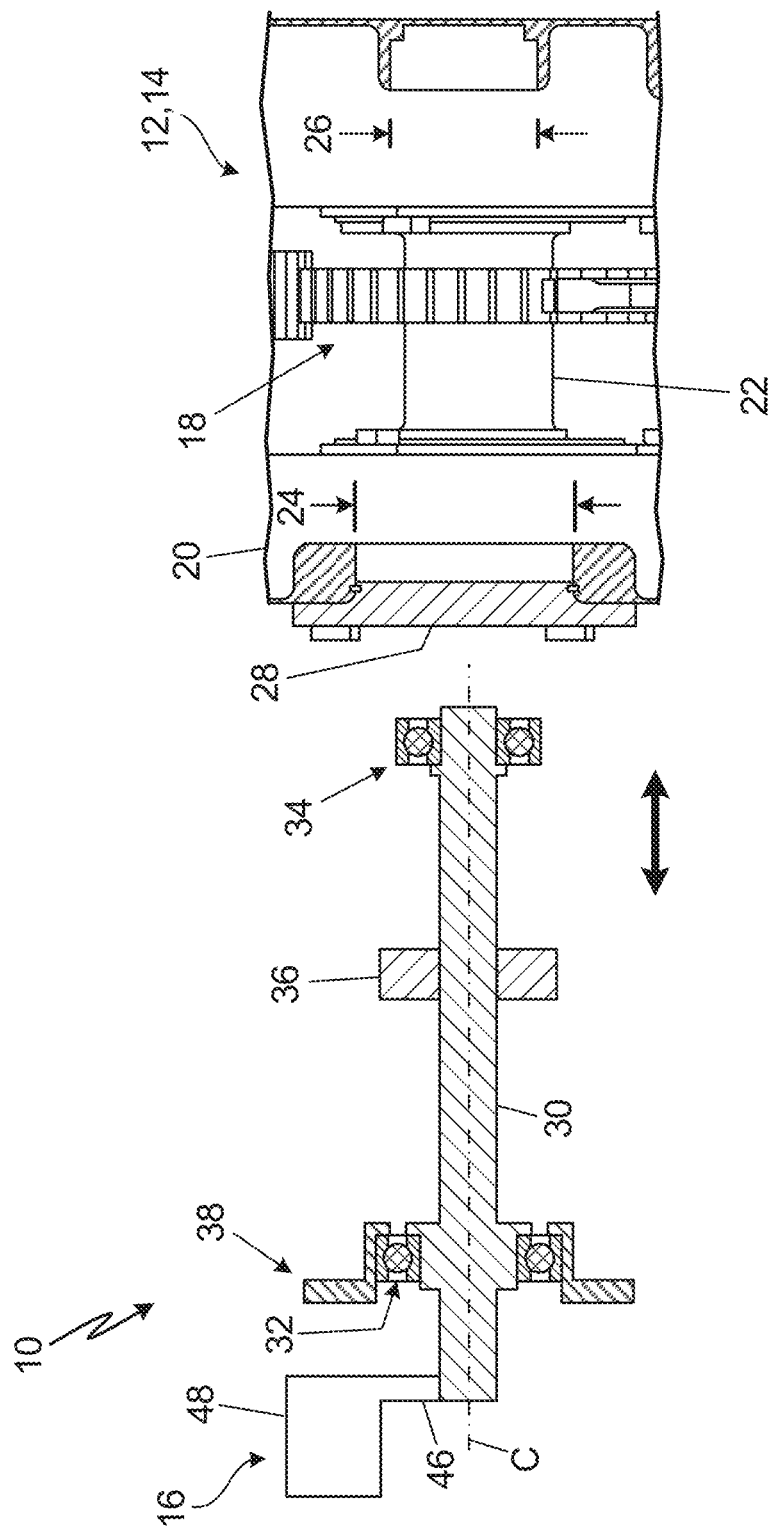
FIG. 2 is a view depicting the crank gear of FIG. 1A and FIG. 1B completely removed from a gearbox of a gas turbine engine.

Gearbox 12 can be any gear train associated with gas turbine engine 14. Examples of gearbox 12 include an auxiliary gearbox, a reduction gearbox, and the like that are rotationally coupled to at least one rotor of gas turbine engine 14. Gearbox 12 includes two or more gears 18 enclosed within housing 20 supported from at least one shaft 22. Port 24 extends through housing 20 to provide external access to at least one driven gear 18 of gearbox 12. In some examples, gearbox 12 includes journal 26 disposed opposite port 24 along an insertion direction. Port 24 and journal 26 support respective bearings of crank gear 10 in an inserted configuration. When crank gear 10 is withdrawn from gearbox 12 through port 24 as shown by FIG. 2, cover 28 can be attached to gearbox 12 with fasteners to block port 24, which can be sealed by one or more seals and/or gasket disposed between the cover 28 and port 24, and/or between cover 28 and housing 20.

Crank gear 10 includes shaft 30, first bearing 32, second bearing 34, gear 36, and interface 16. Shaft 30 extends along centerline C from first end 30A to second end 30B, which is opposite first end 30A. Shaft 30 can have a solid or hollow cross-section, and may be constructed from any suitable material including, but not limited to carbon steel, austenitic steel, titanium, among other possible materials. Shaft 30 can include one or more major diameter sections and/or one or more minor diameter sections to accommodate inner diameters of first bearing 32, second bearing 34, and gear 36.

First bearing 32 and second bearing 34 are mounted to shaft 30 such as by a press fit, a key and groove, or other suitable mechanical attachment. First bearing 32 is spaced from first end 30A along centerline C and is disposed at or near an exterior end of crank gear 10. When inserted into gearbox 12, the location of first bearing 32 coincides with port 24 of gearbox 12. Second bearing 34 is disposed at or near second end 30B, an interior end of crank gear 10. The location of second bearing 34 coincides with journal 26 of gearbox 12 in the inserted configuration. To facilitate insertion into gearbox 12, an outer diameter of first bearing 32 (e.g., an outer diameter of an outer race) is larger than an outer diameter of second bearing 34. First bearing 32 and second bearing 34 can be any suitable bearing type including, but not limited to, roller bearings, needle bearings, journal bearings, bushings, among other possible examples.

In some examples, first bearing 32 and second bearing 34 are the same bearing type, while other examples of crank gear 10 may include different bearing types for first bearing 32 and second bearing 34. As depicted in FIG. 1A and FIG. 1B, first bearing 32 and second bearing 34 are roller bearings.

First bearing 32 can be received within support ring 38 in some examples of crank gear 10, such as the example depicted by FIG. 1A and FIG. 1B. Support ring 38 includes bore 40 and flange 42. Bore 40 is concentric with centerline C and defines an interior diameter of support ring 38 sized to receive an outer diameter (e.g., an outer race) of first bearing 32. For example, bore 40 can form a location fit or an interference fit with an outer diameter of first bearing 32 sufficient to prevent axial and/or rotation about centerline C. In other examples, bore 40 can be adapted to include axial stops and/or keyways to prevent relative axial and/or rotational movement with first bearing 32. Flange 42 extends radially outward from support ring 38 and includes axial abutment face 44 for engaging an opposing surface of gearbox 12. Further, flange 42 can include a pattern of through-thickness holes sized to receive corresponding fasteners, which may be used to attach crank gear 10 to gearbox 12. Examples of fastener patterns include any symmetrical or asymmetrical pattern of two or more fasteners. Leading edges of support ring 38 with respect to an insertion direction of crank gear 10 can be tapered or chamfered to facilitate insertion of crank gearbox into gearbox 12.

In the example depicted by FIG. 1A and FIG. 1B, gear 36 mounts to shaft 30 at a location between first bearing 32 and second bearing 34 and includes a gear type, tooth number, and tooth profile complementary to at least one gear of gearbox 12 (e.g., a driven gear). Example gear types include, but are not limited to, spur gears, helical gears, and bevel gears, among other possible gear types. Some examples of gear 36 include gear teeth with a tapered leading-edge profile (e.g., a chisel profile) to aid alignment of gear 36 with one or more gears of gearbox 12.

Interface 16 is arranged at first end 30A of shaft 30 and facilitates rotation of crank gear 10 about centerline C by an operator. As depicted in FIG. 1A and FIG. 1B, interface 16 includes bar 46 and handle 48 arranged as a hand crank. Bar 46 joins to first end 30A of shaft 30 and extends radially outward relative to centerline C. While bar 46 extends radially normal to centerline R in the depicted example, bar 46 may also extend axially to displace handle 48 further outward from first bearing 32 and, hence, from gearbox 12 in the inserted configuration. Bar 46 can have any suitable cross-section including a rectangular or circular cross-section, among other suitable configurations. Handle 48 is disposed at the distal end of bar 46 and forms a handgrip for the operator. As depicted, handle 48 is cylindrical in form, however other profiled or contoured configurations are contemplated. Bar 46 and handle 48 facilitate application of force F at distance L from centerline C as shown by FIG. 1A.

FIG. 2 depicts crank gear 10 completely removed from gearbox 12 via port 24. With crank gear 10 withdrawn from gearbox 12, cover 28 is attached to housing 20 to block port 24. One or more seals and/or gaskets between cover 28 and port 24 and/or between cover 28 and housing 20 fluidly seals gearbox 12 with crank gear 10 removed.

FIG. 3A and FIG. 3C depict additional examples of interface 16 in which interface includes tool socket 50 implemented in lieu of the hand crank configuration depicted by FIG. 1A and FIG. 1B. Tool socket 50 is a cavity machined or otherwise formed in first end 30A of shaft 30 and is adapted to receive a driver from a separate hand tool such as a wrench, an electric drill, or other similar device.

FIG. 3B and FIG. 3D depict additional examples of interface 16 in which interface includes tool driver 52 implemented in lieu of the hand crank configuration depicted by FIG. 1A and FIG. 1B. Tool driver 52 includes features machined or otherwise formed in an exterior of shaft 30 at first end 30A adapted to receive a separate hand tool such as a wrench, an electric drill, or other device.

Tool socket 50 and tool driver 52 can include any suitable tool profile, or cross-sectional shape. Example tool profiles include, but are not limited to, square, hexagonal, other standard tool profiles, or proprietary tool profiles. FIG. 3A and FIG. 3B depict an example square socket configuration and an example hexagonal socket configuration for crank gear 10. FIG. 3C and FIG. 3D depict an example square tool driver configuration and an example hexagonal tool driver configuration. While certain tool profiles are depicted for crank gear 10, any other suitable tool profile is contemplated herein.

Figure 4A:
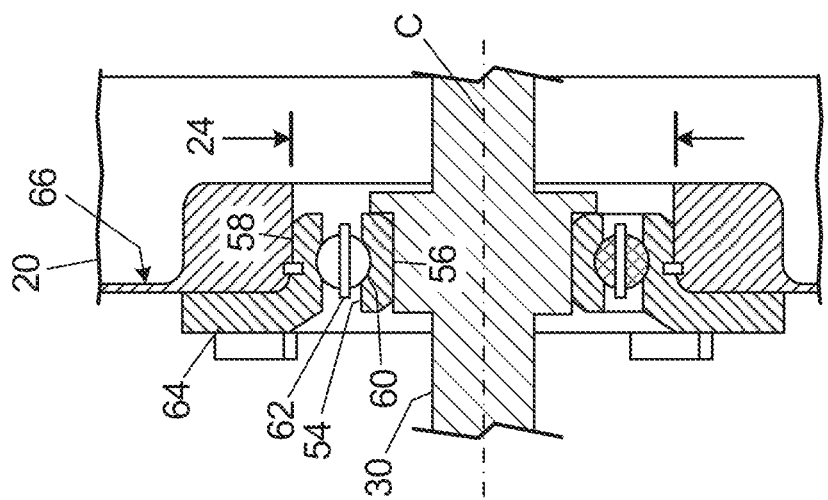
FIG. 4A is a partial cross-sectional view of the crank gear depicting with the support ring of FIG. 1B.
Figure 4B:
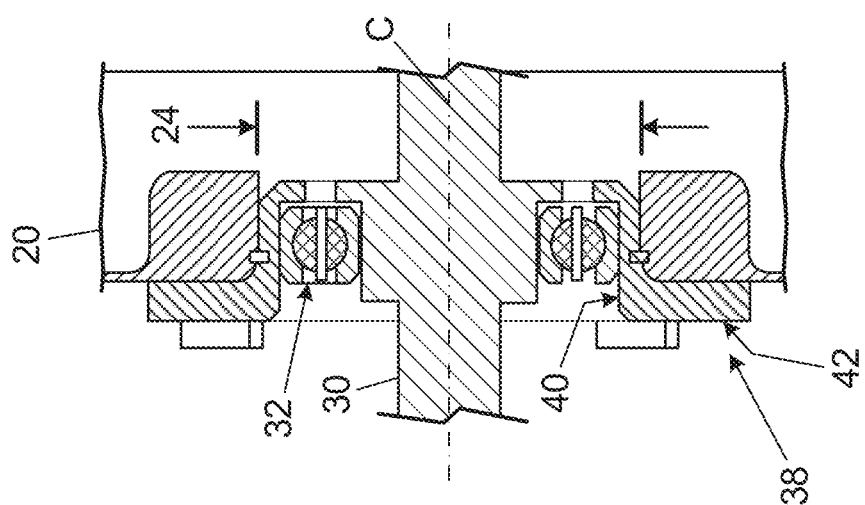
FIG. 4B is a partial cross-sectional view of the crank gear with a custom bearing incorporating features of the support ring.

FIG. 4A is an enlarged view of region B of FIG. 1B depicting first bearing 32, support ring 38, and shaft 30 in greater detail. In lieu of support ring 38, features of support ring 38 can be incorporated into custom bearing 54 such as depicted by FIG. 4B. Custom bearing 54 is a roller bearing mounted to shaft 30 in place of first bearing 32 in some examples that includes inner race 56, outer race 58, balls 60, and retainer 62. Inner race 56 forms a radially inner portion of custom bearing 54 and includes a track shaped to receive balls 60. Outer race 58 forms a radially outer portion of custom bearing 54 and includes a track shaped to receive balls 60. Retainer 62 receives balls 60 to maintain a spaced circumferential configuration of balls 60. Further, outer race 58 includes flange 64 that extends radially outward relative to centerline C to define axial abutment face 66. Flange 64 can include through-thickness holes sized to receive two or more fasteners symmetrically or asymmetrically arranged about centerline C.

With crank gear 10 inserted into gearbox 12, first bearing 32 and second bearing 34 radially support shaft 30 with respect to centerline C. Flange 42 of support ring 38, or flange 64 of custom bearing 54 and associated fasteners axially restrain crank gear 10 with respect to gearbox 12. Crank gear 10 can include one or more seals and/or gaskets between support ring 38 (or custom bearing 54) and port 24 and/or between support ring 38 (or custom bearing 54) and housing 20 that fluidly seals gearbox 12 when crank gear 10 is inserted within gearbox 12.

Figure 5:
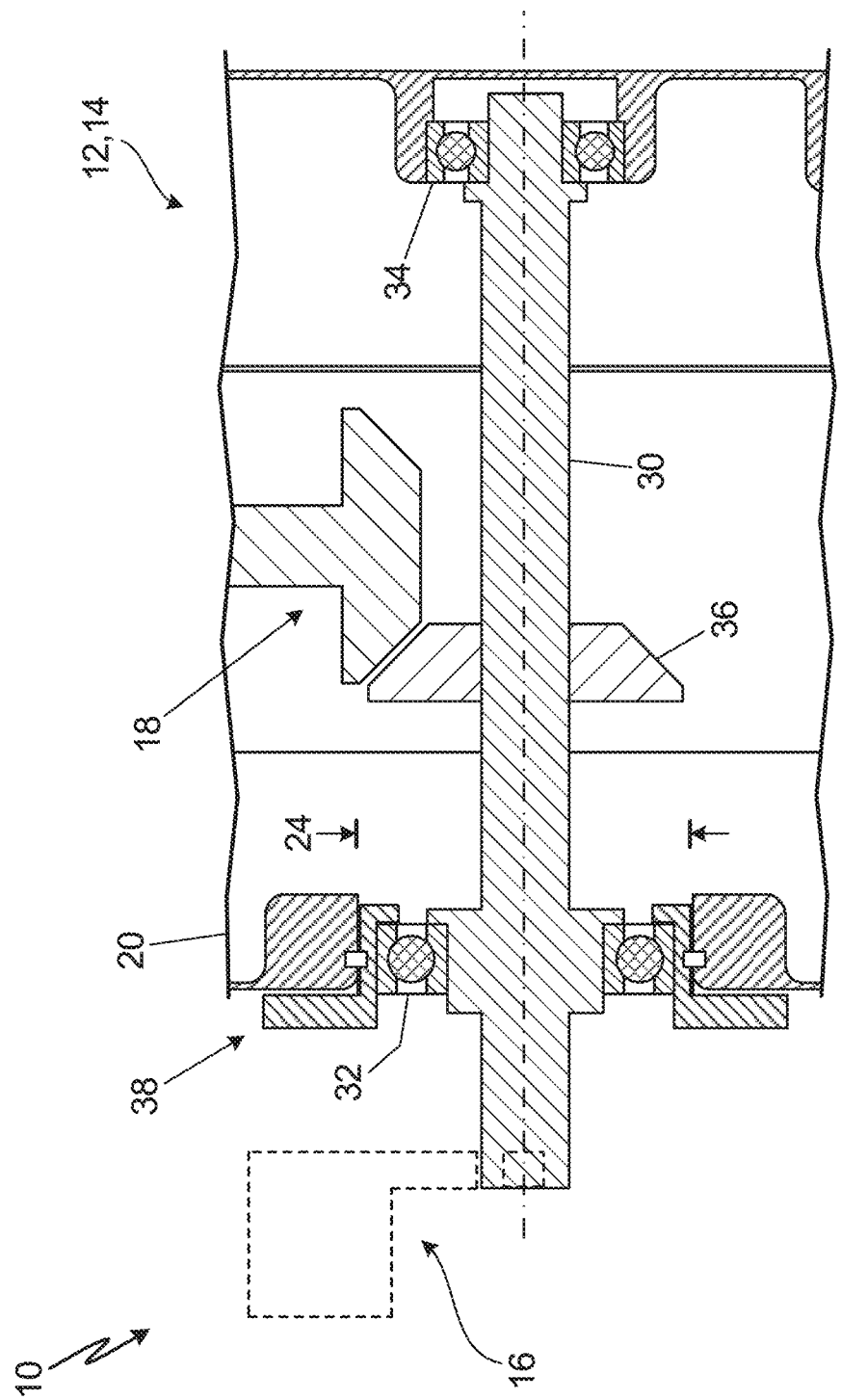
FIG. 5 is a cross-sectional view of the crank gear with a bevel gear

As depicted in FIG. 1B, gear 36 is a spur gear or helical gear and crank gear 10 is configured to be inserted along a direction parallel to the driven gear of gearbox 12. In FIG. 5, crank gear 10 is depicted with bevel gear 36, which is inserted along a non-parallel direction to a rotational axis of the driven gear of gearbox 12. For example, FIG. 5 depicts crank gear 10 inserted along a direction perpendicular to a rotational axis of driven gear 36. However, in other examples, crank gear 10 can be inserted along a direction forming an oblique angle with a rotational axis of driven gear 36. Interface 16 is depicted by dashed lines which can include the hand crank configuration described by FIG. 1A and FIG. 1B, the tool socket configuration described by FIG. 3A and FIG. 3C, or the tool driver configuration described by FIG. 3B and FIG. 3D.

Figure 6:
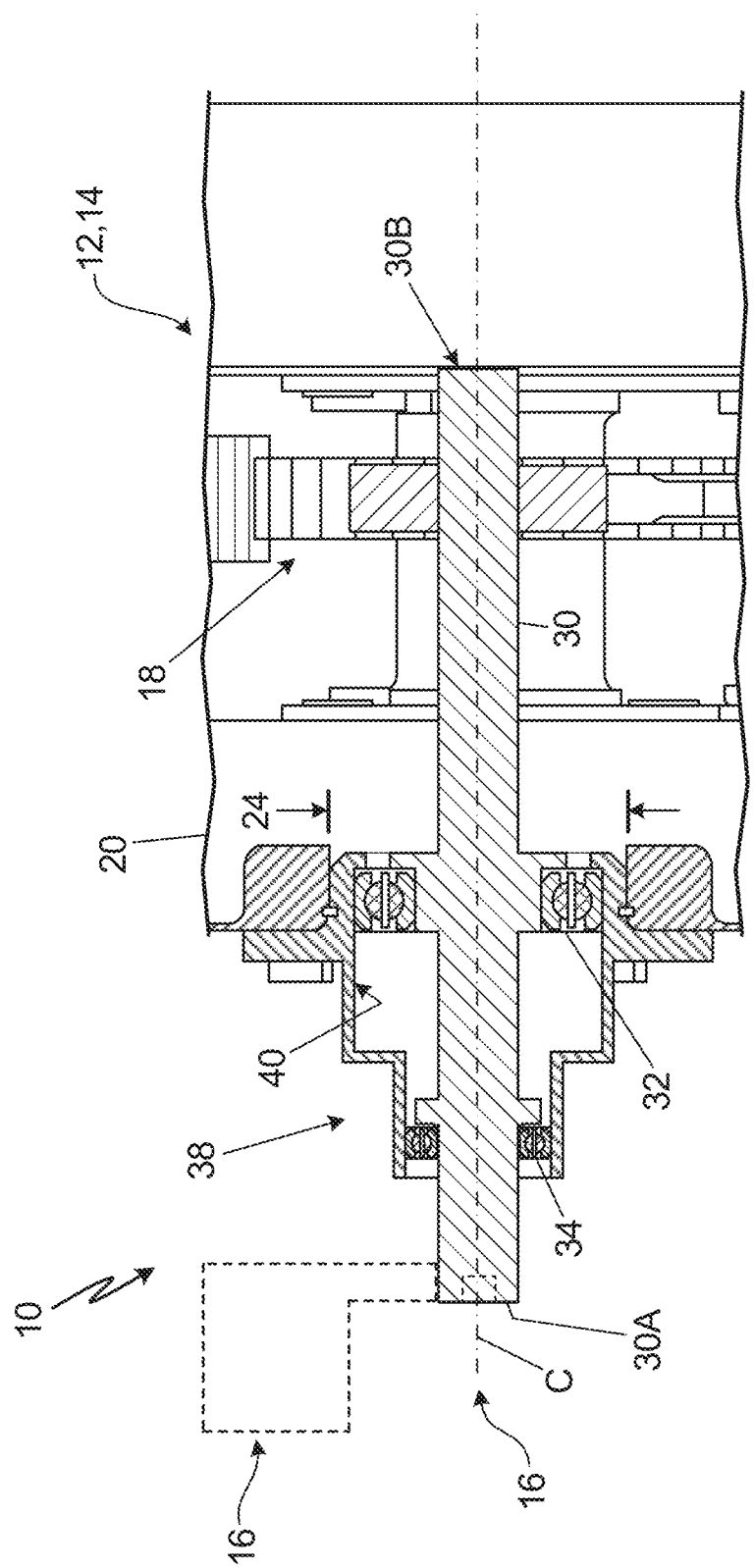
FIG. 6 is a cross-sectional view of the crank gear with a cantilevered spur gear or helical gear configuration.
Figure 7:
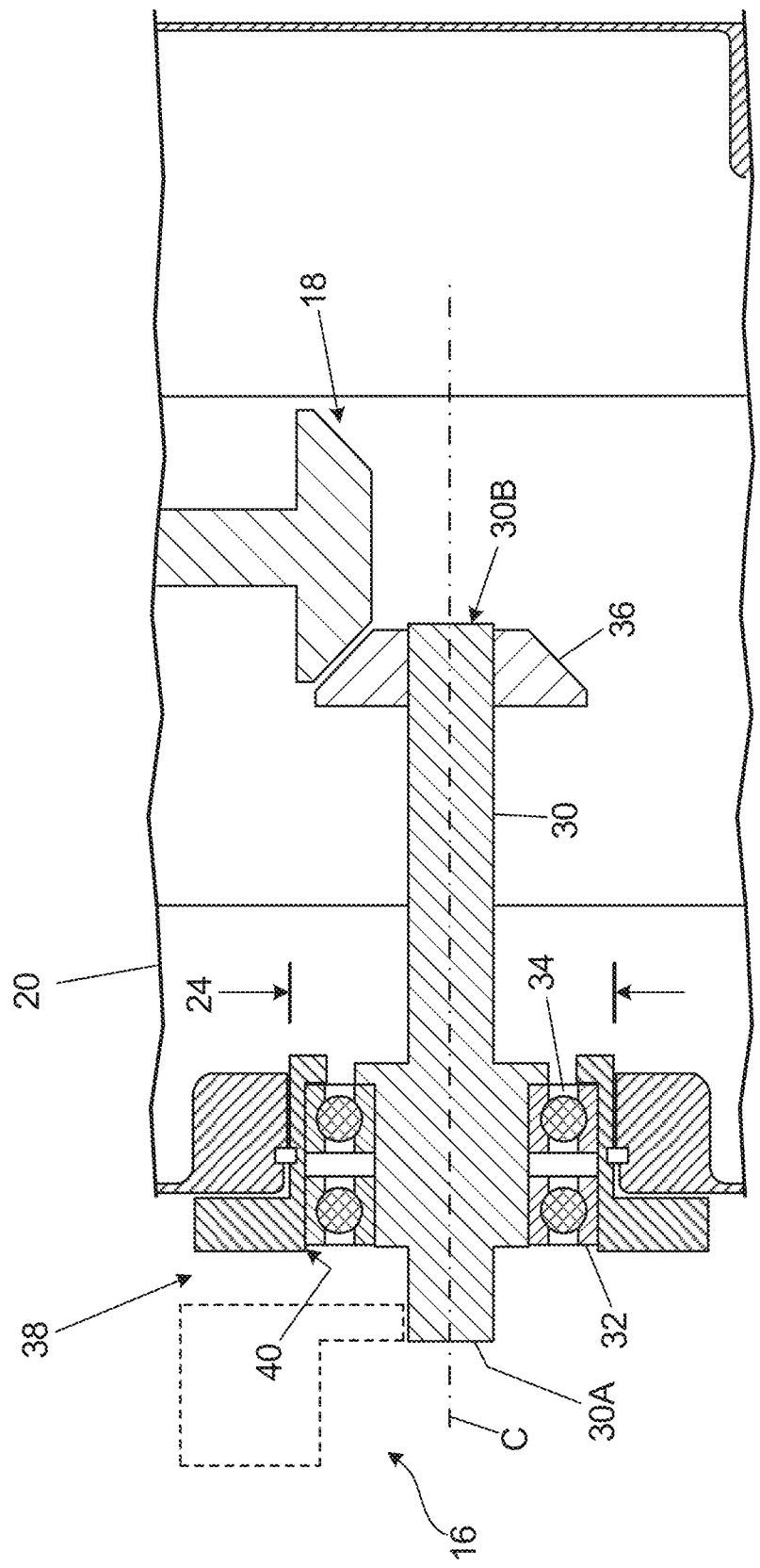
FIG. 7 is a cross-sectional view of the crank gear with a cantilevered bevel gear configuration.

FIG. 6 and FIG. 7 depict cantilevered configurations for crank gear 10 in which first bearing 32 and second bearing 34 are each spaced from first end 30A and gear 36 is disposed at second end 30B. FIG. 6 depicts a cantilevered configuration of crank gear 10 with spur gear 36 (or helical gear) and an insertion direction that is parallel to a rotational axis of a driven gear of gearbox 12. FIG. 7 depicts a cantilevered configuration of crank gear 10 with bevel gear 36 in which the insertion direction is non-parallel to a rotational axis of a driven gear of gearbox 12 (e.g., perpendicular to a rotational axis of driven gear 36). In cantilevered configurations, support ring 38 can be extended to receive first bearing 32 and second bearing 34 within bore 40. Interface 16 is depicted by dashed lines which can include the hand crank configuration described by FIG. 1A and FIG. 1B, the tool socket configuration described by FIG. 3A and FIG. 3B, or the tool driver configuration described by FIG. 3C and FIG. 3D.

Figure 8:
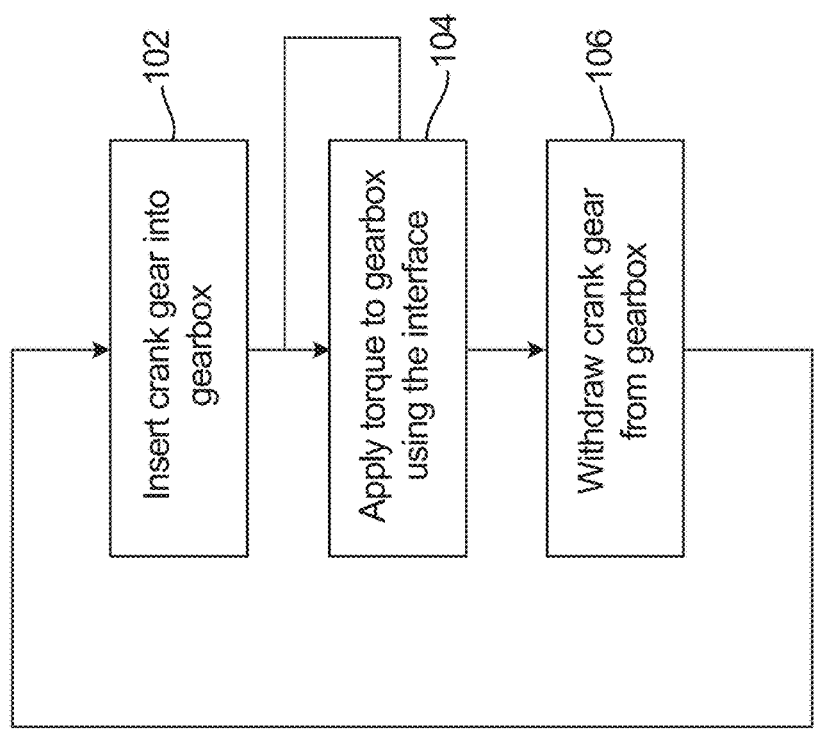
FIG. 8 is a flowchart describing a method of turning a rotor of a gas turbine engine using the crank gear.

FIG. 8 depicts method 100 for rotating a rotor of gas turbine engine 14 using crank gear 10. The sequence depicted is for illustrative purposes only and is not meant to limit the method 100 in any way as it is understood that the portions of the method can proceed in a different logical order, additional or intervening portions can be included, or described portions of the method can be divided into multiple portions, or described portions of the method can be omitted without detracting from the described above. Method 100 includes step 102, step 104, and step 106.

During step 102, an operator inserts crank gear 10 through port 24 of gearbox 12. Gear 36 engages driven gear 36 of gearbox 12 and second bearing 34 is received within journal 26. Flange 42 of support ring 38, or flange 64 of custom bearing 54 abuts an opposing surface of housing 20 and fasteners affix crank gear 10 to gearbox 12. Insertion may include rotational alignment of gear 36 with driven gear 18 by operator, which may or may not be aided by a tapered leading edge tooth profile of gear 36, or other alignment aid. In some examples, crank gear 10 is inserted along a direction parallel to a rotational axis of driven gear 36. In other examples, crank gear 10 is inserted along a non-parallel direction relative to a rotational axis of driven gear 36.

At step 104, the operator applies torque to interface 16. Mutual engagement of gear 36 and driven gear 18 causes gearing of gearbox 12 to rotate and thereby the rotor of gas turbine engine 14 to rotate. The amount of rotation during step 104 is arbitrary and can amount to a partial rotation, full rotation, or multiple full and/or partial rotations of the rotor. Step 104 can be repeated by the operator periodically until rotation of the rotor is no longer required.

During step 106, the operator completely withdrawn crank gear 10 from gearbox 12 through port 24, as depicted by FIG. 2. Port 24 can be blocked prior to and/or after use of crank gear 10 during step 106 by affixing cover 28 to housing 20 of gearbox 12.

Crank gear 10 as described above replaces permanent features incorporated into gearbox 12 such as additional shafts, tool interfaces, and bearings, among other possible components, which thereby reduces weight and complexity of gearbox 12. The operational cycle life of crank gear 10 is significant less relative to a permanent, dedicated gearbox features that allows crank gear 10 to be constructed from less expensive materials and reduces the cost of replacement or repair relative to a dedicated, permanent features of gearbox 12. In each of the foregoing examples, crank gear 10 can be completely removed from gearbox 12 for normal operation of gas turbine engine.

DISCUSSION OF POSSIBLE EMBODIMENTS

The following are non-exclusive descriptions of possible embodiments of the present invention.

Crank Gear

A crank gear according to an example embodiment of this disclosure, among other possible things, includes a shaft, a first bearing, a second bearing, a gear, and an interface. The shaft extends from a first end to a second end along a centerline axis, the second end opposite the first end. The first bearing, the second bearing, and the gear are mounted to the shaft. The interface is at the first end of the shaft for rotating the shaft and the gear about the centerline.

The crank gear of the preceding paragraph can optionally include, additionally and/or alternatively, any one or more of the following features, configurations and/or additional components.

A further embodiment of the foregoing crank gear, wherein the first bearing can be spaced from the first end, and wherein the second bearing can be at the second end, and wherein the gear is between the first bearing and the second bearing.

A further embodiment of any of the foregoing crank gears, wherein the gear can be at the second end, and wherein the first bearing and the second bearing can be between the first end and the gear.

A further embodiment of any of the foregoing crank gears, wherein the interface can include a bar and a handle.

A further embodiment of any of the foregoing crank gears, wherein the bar of the interface can extend radially outward from a first end of the shaft relative to the centerline axis, and wherein the handle can be joined to a distal end of the bar.

A further embodiment of any of the foregoing crank gears, wherein the interface can include one of a tool socket or a tool driver.

A further embodiment of any of the foregoing crank gears, wherein one of the tool socket or the tool driver can have a square profile.

A further embodiment of any of the foregoing crank gears, wherein one of the tool socket or the tool driver can have a hexagonal profile.

A further embodiment of any of the foregoing crank gears, wherein an outer diameter of the first bearing can be greater than an outer diameter of the second bearing.

A further embodiment of any of the foregoing crank gears can further comprising a support ring comprising a bore that receives the first bearing and a flange extending radially outward from the bore.

A further embodiment of any of the foregoing crank gears, wherein the first bearing can include an outer race and a flange extending radially outward from the bore.

A further embodiment of any of the foregoing crank gears, wherein the gear can be a spur gear.

A further embodiment of any of the foregoing crank gears, wherein the gear can be a helical gear.

A further embodiment of any of the foregoing crank gears, wherein the gear can be a bevel gear.

a Gas Turbine Engine with Gearbox Compatible with a Crank Gear

A gas turbine engine according to an example embodiment of this disclosure, among other possible things, includes a gearbox and a crank gear. The gearbox includes a plurality of gears, a housing enclosing the plurality of gears, and a port extending through the housing to access at least one gear of the plurality of gears. The crank gear is reversibly insertable through the port of the housing. The crank gear includes a shaft, a first bearing, a second bearing, a gear, and an interface. The shaft extends from a first end to a second end along a centerline axis, the second end opposite the first end. The first bearing, the second bearing, and the gear are mounted to the shaft. The interface is at the first end of the shaft for rotating the shaft and the gear about the centerline. The gear engages at least one gear in an inserted configuration of the crank gear.

The gas turbine engine of the preceding paragraph can optionally include, additionally and/or alternatively, any one or more of the following features, configurations and/or additional components.

A further embodiment of the foregoing gas turbine engine, wherein the first bearing can be spaced from the first end, and wherein the second bearing can be at the second end, and wherein the gear is between the first bearing and the second bearing.

A further embodiment of any of the foregoing gas turbine engines, wherein the gear can be at the second end, and wherein the first bearing and the second bearing can be between the first end and the gear.

A further embodiment of any of the foregoing gas turbine engines, wherein the interface can include a bar and a handle.

A further embodiment of any of the foregoing gas turbine engines, wherein the bar of the interface can extend radially outward from a first end of the shaft relative to the centerline axis, and wherein the handle can be joined to a distal end of the bar.

A further embodiment of any of the foregoing gas turbine engines, wherein the interface can include one of a tool socket or a tool driver.

A further embodiment of any of the foregoing gas turbine engines, wherein one of the tool socket or the tool driver can have a square profile.

A further embodiment of any of the foregoing gas turbine engines, wherein one of the tool socket or the tool driver can have a hexagonal profile.

A further embodiment of any of the foregoing gas turbine engines, wherein an outer diameter of the first bearing can be greater than an outer diameter of the second bearing.

A further embodiment of any of the foregoing gas turbine engines can further comprising a support ring comprising a bore that receives the first bearing and a flange extending radially outward from the bore.

A further embodiment of any of the foregoing gas turbine engines, wherein the first bearing can include an outer race and a flange extending radially outward from the bore.

A further embodiment of any of the foregoing gas turbine engines, wherein the gear can be a spur gear.

A further embodiment of any of the foregoing gas turbine engines, wherein the gear can be a helical gear.

A further embodiment of any of the foregoing gas turbine engines, wherein the gear can be a bevel gear.

A Method for Rotating a Rotor of Gas Turbine Engine Using a Crank Gear

A method for manually rotating a rotor of a gas turbine engine according to an example embodiment of this disclosure, among other possible things, includes inserting, by an operator, a crank gear through a port of a gearbox until mutual engagement of the gear of the crank gear and at least one gear of the gearbox. The method further includes rotating the rotor of the gas turbine engine by the operator applying a torque to the interface of the crank gear.

The method of the preceding paragraph can optionally include, additionally and/or alternatively, any one or more of the following features, configurations and/or additional components.

A further embodiment of the foregoing method, wherein the crank gear can be inserted along a direction parallel to a rotational axis of the at least one gear of the gearbox.

A further embodiment of any of the foregoing methods, wherein the crank gear can be inserted along a non-parallel direction relative to the rotational axis of the at least one gear of the gearbox.

A further embodiment of any of the foregoing methods, further comprising removing the crank gear completely from the gearbox.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
   a gearbox comprising a plurality of gears, a housing enclosing the plurality of gears, and a port extending through the housing to access at least one gear of the plurality of gears; and
   a crank gear reversibly insertable through the port of the housing, the crank gear comprising:
      a shaft extending from a first end to a second end along a centerline axis, the second end opposite the first end;
      a first bearing mounted to the shaft and spaced from the first end;
      a second bearing mounted to the shaft at a second end of the shaft opposite the first end;
      a gear mounted to the shaft between the first bearing and the second bearing; and
      an interface at the first end for rotating the shaft and the gear about the centerline;
      wherein the gear engages the at least one gear in an inserted configuration of the crank gear.

2. The gas turbine engine of claim 1, wherein the interface comprises:
   a bar extending radially outward from a first end of the shaft relative to the centerline axis; and
   a handle joined to a distal end of the bar.

3. The gas turbine engine of claim 1, wherein the interface comprises one of a tool socket or a tool driver having one of a square profile or a hex profile.

4. The gas turbine engine of claim 1, wherein an outer diameter of the first bearing is greater than an outer diameter of the second bearing.

5. The gas turbine engine of claim 1, further comprising:
   a support ring comprising a bore that receives the first bearing, wherein the support ring comprises a flange extending radially outward from the bore that engages the housing to axially restrain the crank gear with respect to the housing.

6. The gas turbine engine of claim 1, wherein the first bearing comprises an outer race and a flange extending radially outward from the outer race that engages the housing to axially restrain the crank gear with respect to the housing.

7. The gas turbine engine of claim 1, wherein the gear is one of a spur gear, a helical gear, or a bevel gear.

8. The gas turbine engine of claim 1, wherein the crank gear is reversibly insertable along a direction parallel to a rotational axis of the at least one gear of the gearbox.

9. The gas turbine engine of claim 1, wherein the crank gear is reversibly insertable along a non-parallel direction relative to the rotational axis of the at least one gear of the gearbox.

10. A method for manually rotating a rotor of a gas turbine engine using a crank gear comprising a shaft extending from a first end to a second end along a centerline axis, the second end opposite the first end, a first bearing mounted to the shaft and spaced from the first end, a second bearing mounted to the shaft at a second end of the shaft opposite the first end, a gear mounted to the shaft between the first bearing and the second bearing, and an interface at the first end for rotating the shaft and the gear about the centerline, the method comprising:

inserting, by an operator, the crank gear through a port of a gearbox until mutual engagement of the gear of the crank gear and at least one gear of the gearbox; and rotating the rotor of the gas turbine engine by the operator applying a torque to the interface of the crank gear.

11. The method of claim 10, wherein the crank gear is inserted along a direction parallel to a rotational axis of the at least one gear of the gearbox.

12. The method of claim 11, wherein the crank gear is inserted along a non-parallel direction relative to the rotational axis of the at least one gear of the gearbox.

13. The method of claim 12, further comprising:

removing the crank gear completely from the gearbox.

\* \* \* \* \*